(12) United States Patent
Leu

(10) Patent No.: US 11,429,452 B2
(45) Date of Patent: Aug. 30, 2022

(54) METHOD FOR DISTRIBUTING KEYS USING TWO AUXILIARY HASHING FUNCTIONS

(71) Applicant: PayPal, Inc., San Jose, CA (US)

(72) Inventor: Eric Leu, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 296 days.

(21) Appl. No.: 16/850,643

(22) Filed: Apr. 16, 2020

(65) Prior Publication Data

US 2021/0326183 A1    Oct. 21, 2021

(51) Int. Cl.
*G06F 9/50*    (2006.01)
(52) U.S. Cl.
CPC ................ *G06F 9/5066* (2013.01)
(58) Field of Classification Search
None
See application file for complete search history.

(56) References Cited

U.S. PATENT DOCUMENTS

| 8,095,935 | B2 | 1/2012 | Paramasivam et al. |
| 8,438,574 | B1 * | 5/2013 | Lyle .................. G06F 9/50 718/103 |
| 8,755,283 | B2 | 6/2014 | Patel et al. |
| 8,850,002 | B1 * | 9/2014 | Dickinson .......... H04L 67/1002 709/227 |
| 9,367,600 | B2 | 6/2016 | Moyne et al. |
| 10,069,903 | B2 | 9/2018 | Sorenson, III et al. |
| 10,135,914 | B2 | 11/2018 | Sorenson, III et al. |
| 11,100,073 | B2 * | 8/2021 | Hsiao .................. G06F 16/182 |

* cited by examiner

*Primary Examiner* — Eric C Wai
(74) *Attorney, Agent, or Firm* — Kowert, Hood, Munyon, Rankin & Goetzel, P.C.; Scott W. Pape; Dean M. Munyon

(57) ABSTRACT

This disclosure includes an improvement to hashing methods, which can help achieve faster load balancing of computing resources (e.g., processors, storage systems, web servers or other computer systems, etc.) This improvement may be particularly beneficial when a quantity of the available resources changes. Such hashing methods may include assigning a data object associated with a key to a particular computing resource of the available computing resources by using two auxiliary functions that work together to uniformly distribute data objects across available computing resources and reduce an amount of time to assign the data object to the particular computing resource.

20 Claims, 9 Drawing Sheets

*Hashing Algorithm 207*

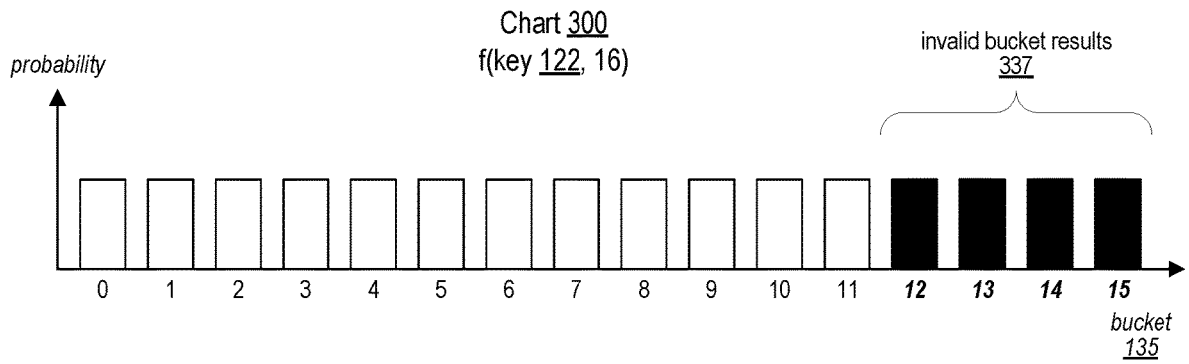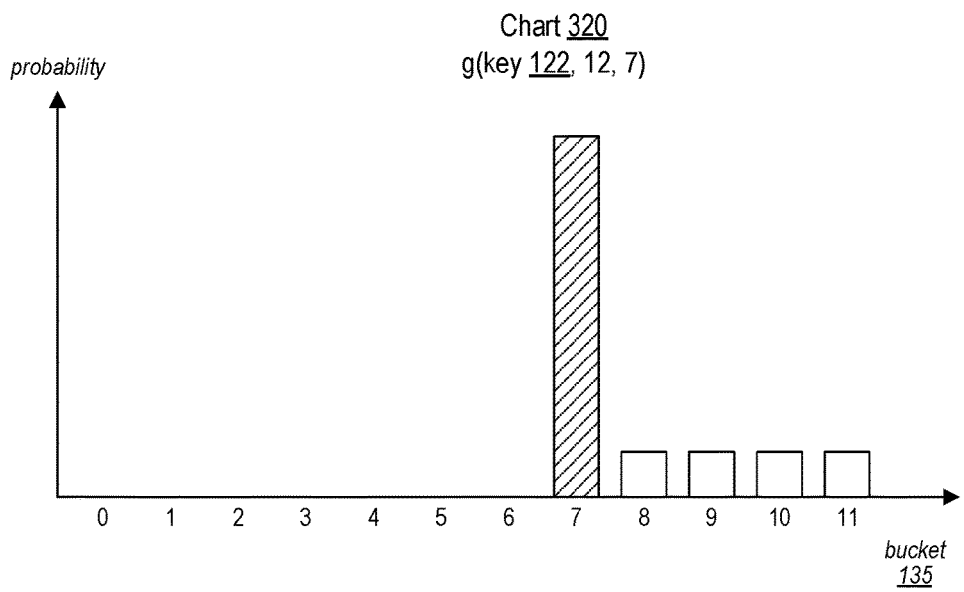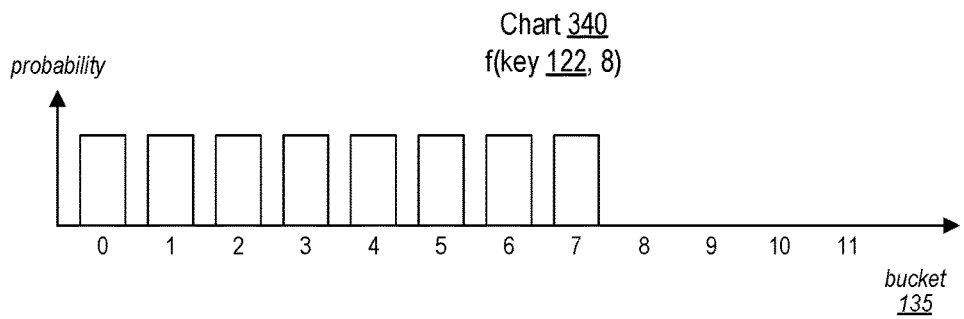
FIG. 3

500

Start
501

Receiving, by a computer system, a key associated with a data object to be associated with one of N buckets.
510

Determining, by the computer system, a first result using a first hashing function to hash the key into one of M buckets, wherein M is an integer greater than N.
520

In response to determining that the first result is greater than N, determining, by the computer system, a second result by hashing the key into a first range within the N buckets using a second hashing function in which the probability of a given key being mapped to a bucket S within the first range is greater than a probability of the given key being mapped to remaining buckets within the first range.
530

In response to determining that the second result corresponds to bucket S, assigning, by the computer system, the data object to a third result by hashing the key into a second, different, range of the N buckets using a third hashing function.
540

End
590

FIG. 5

METHOD FOR DISTRIBUTING KEYS USING TWO AUXILIARY HASHING FUNCTIONS

BACKGROUND

Technical Field

This disclosure relates generally to computer system operations, and more particularly to distributing keys across multiple buckets within a server computer system according to various embodiments.

Description of the Related Art

Computer systems are often tasked with assigning items to one of a plurality of groups, which are commonly referred to as "buckets." Applicant recognizes that a uniform distribution may be desirable to balance workloads across circuits that are assigned tasks based on the buckets. For example, uniformly distributing data storage across storage arrays may avoid an increase in wear on a given storage array that would otherwise see an increased share of usage. Uniformly distributing process threads across processor cores may increase performance of a computer system by avoiding an overload of a single processor core.

A hashing algorithm may be used by a computer system for uniformly distributing items into a range of buckets. Characteristics of a hashing algorithm include time complexity and consistent hashing. "Time complexity," as used herein, refers to a variance in an amount of time required to perform a mapping assignment for a given keyword as a number of buckets increases. A time complexity of O(1) may be desirable in some embodiments as O(1) indicates an algorithm that requires a same amount of time to perform a mapping assignment regardless of the number of buckets being mapped. A constant time complexity may allow for constant time performance even as a number of resources being utilized changes. Traditional hashing may use a modulo operation to compute the hash value as follows: I=key mod N, where 'key' is a reference to an item being assigned, 'N' is the number of buckets available for assignment, and I is the assigned bucket. Such a computation takes O(1) time complexity and provides a uniform distribution. But in various applications, the number of buckets may often change, which may force the necessity of remapping many (or most) of the keys to different buckets. This reshuffling is frequently undesirable, particularly in applications such as distributed caching.

Consistent hashing is a technique that may be used when facing a scenario that involves a changing number of buckets. It finds application in a wide range of use cases, including web caching, distributed caching, and distributed key-value store to balance load in a cluster. Consistent hashing techniques, as compared to traditional hashing methods, may result in a reduction of a number of keys that need to be remapped in response to a change in the number of buckets (i.e., the hash table size). This advantage, however, comes at the expense of greater complexity relative to traditional hashing. One current high-performance consistent hashing method has O(log n) complexity, for example. Accordingly, Applicant realizes that a flexible and generic method for distributing computer data items across multiple buckets in a uniform and consistent manner (e.g. storage destinations) would be useful in a variety of contexts.

BRIEF DESCRIPTION OF THE DRAWINGS

FIG. 3 includes three charts showing a bucket assignment technique for a hashing algorithm.

FIG. 5 shows a flow diagram of an embodiment of a method for a hashing algorithm to assign keys to buckets.

DETAILED DESCRIPTION

Figure 1:
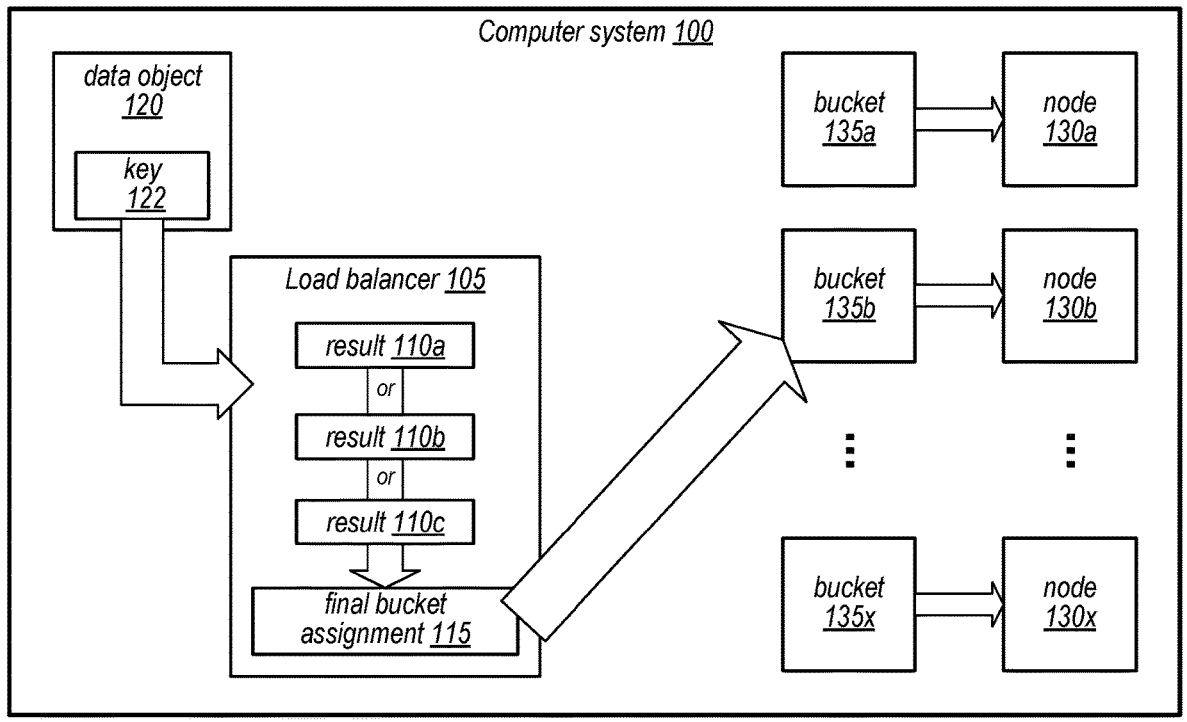
FIG. 1 is a block diagram illustrating an embodiment of a computer system that maps a key to one of multiple nodes.

To uniformly distribute a workload across multiple computing resources, a computer system may utilize a load balancer process. The "load balancer," as used herein, includes a process that runs on a computer system to assign incoming tasks to one of a plurality of resources in a manner that attempts to avoid overloading or underloading particular ones of the resources in comparison to the other resources. Computing resources may be any circuits or other hardware in a computing system that are used during execution of programs in the computing system, and tasks may refer to any computing job that is performed by a computing resource. For example, the computing resources may include computing nodes used for web caching in a server computer system, and the tasks include data management for web pages being cached.

The present inventors have recognized a benefit of a hashing algorithm that has both a time complexity of O(1) and consistent hashing. Embodiments of hashing algorithms are disclosed herein that provide both constant time complexity and consistent hashing. One technique for implementing a hashing algorithm that maps a key to one of N buckets includes determining a first bucket assignment by using a first hashing function to map the key to one of M buckets, where M is an integer greater than or equal to N. In this technique, if the first bucket assignment corresponds to one of the N buckets, then the mapping process ends. Otherwise, a second bucket is determined by hashing the key into a first range within the N buckets using a second hashing function. In the second hashing function, the probability of a given key being mapped to a bucket S within the first range is greater than a probability of the given key being mapped to remaining buckets within the first range. The key is assigned to a final bucket based on whether the second bucket corresponds to bucket S.

The present disclosure describes a hashing technique that provides advantages of consistent hashing (e.g., reduced key remapping) while providing improved performance in many cases. This technique, which may be referred to as "PowerHash," maps items such as hash keys to buckets. A bucket is a logical entity that represents a node or resource. For example, FIG. 1 describes this technique in one possible sample context—a load balancer that receives data objects and maps the data object to one of a plurality of data nodes based on the data object's key.

In various embodiments, key mapping may be computed in real time with this technique without using a mapping table. For a given key and a number of buckets N, the function PowerHash(key, N) returns a bucket number, which may, for example, be in the range [0, N−1]. PowerHash is implemented in some embodiments using two auxiliary hash functions, which may be referred to as f( ) and g( ). The two functions work together to achieve O(1) time complexity as well as to achieve uniform distribution of hash values.

Auxiliary function f(key, M) takes input parameters key and M, where key is the item being hashed and M is a number that is a smallest integer that is a power of 2 and that is greater than or equal to N. Function f(key, M) uniformly distributes keys among the M buckets, for example within the range [0, M−1].

Auxiliary function g(key, N, S) takes input parameters key, N and S. Here, S is a number less than N. Together, S and N define an integer range of S to N−1. Function g(key, N, S) returns a bucket number in this range, for example [S, N−1]. Function go has a property such that the number of keys mapped to bucket S is expected to be (S+1) times the number of keys mapped to any other bucket I, where $S<I\leq N-1$. Except for bucket S, all other buckets (in the range of S+1 to N−1) are expected to have the same number of keys.

The use of auxiliary functions f( ) and g( ) to implement this hashing technique are described in detail below. This technique may achieve O(1) complexity to assign a key, while at the same time exhibiting several other desirable traits. Performance tests show that the disclosed technique has superior speed and scalability across a large range of bucket numbers. This technique thus constitutes a fast, consistent, hash method. Notably, it does not build a mapping table for key lookup, which helps achieve very high scalability with minimal memory footprint. An embodiment of the PowerHash function is described below in regards to FIGS. 1 and 2. The auxiliary function f( ) may be used as hashing functions 151 and/or 153 shown in FIGS. 1 and 2, while the auxiliary function g( ) may be used as the illustrated hashing function 152.

An example computer system that utilizes a load balancer that uses the PowerHash algorithm for assigning a key to one of a set of N nodes is illustrated in FIG. 1. Computer system 100 utilizes load balancer 105 to map data object 120 to one of nodes 130*a*-130*x* (collectively nodes 130) using key 122 that is associated with data object 120. Computer system 100 corresponds to any suitable system that may map a data object to one of a set of nodes. For example, computer system 100 may be a server computer system that includes a plurality of computing devices, or a single computing device such as a desktop, laptop, or mobile device. As illustrated, load balancer 105 is a program process running on computer system 100. Data object 120 may be any suitable set of data values to be mapped to one of nodes 130, for example, information related to one or more web pages being accessed by a particular user. It is noted that a load balancer process is used herein to demonstrate the disclosed concepts. It is contemplated that various other computing process may utilize the PowerHash algorithm.

Nodes 130 may each be a computing device that is included as part of a server computer system 100, while in other embodiments, nodes 130 may each be a storage array within a storage device coupled to a desktop computer system 100. Generally, in various embodiments, nodes 130 may be any computing resource or other object (software, hardware, or both) that is mapped to a corresponding destination bucket 135 that is determined using a hashing algorithm. Buckets 135*a*-135*x* (collectively buckets 135) are data values used to identify corresponding ones of nodes 130. Numbering for both buckets 135*a*-135*x* and nodes 130*a*-130*x* may utilize any suitable numbering convention. For example, if N is twenty, indicating twenty nodes 130, then node 130*a* may be identified as node 0 and node 130*x* as node 19. Nodes 130 and buckets 135 are both shown as ranging from 'a' to 'x' for clarity, but may, in some embodiments, have different numbering conventions. In addition, a one-to-one correspondence is illustrated between nodes 130 and buckets 135, although, as disclosed below in regards to FIG. 4, the node mapping may be weighted such that some nodes may be mapped from more than one bucket.

As shown, when data object 120 is to be assigned to one of nodes 130, load balancer 105, executing on computer system 100, receives key 122 associated with data object 120. The number of nodes, from node 130*a* to node 130*x*, is equal to a positive integer 'N.' Key 122 is a value that is unique to data object 120 while data object 120 is in use by computer system 100. In some embodiments, for example, key 122 may correspond to an internet protocol (IP) address of a client computer associated with data object 120 (e.g. when incoming requests to a web service needs to be load-balanced among various web servers).

Load balancer 105 assigns data object 120 to one of N buckets 135 by determining a first result 110*a* that maps key 122 to one of M buckets, where M is an integer that is a power of two and greater than or equal to N. In response to determining that result 110*a* is less than N, load balancer 105 selects result 110*a* as a final bucket assignment 115 for key 122, and therefore, data object 120. As shown in FIG. 1, a first hashing function 151 generates first result 110*a* that corresponds to one of the M buckets 135*a*-135*y*. Buckets 135*x*+1 to 135*y*, however, do not correspond to nodes that are actually available in computer system 100, but are instead used for function 151. Function 151 maps a key to a particular one of buckets 135. Accordingly, load balancer 105 selects a value of M using a smallest power of two value that is greater than or equal to N. If result 110*a* indicates a bucket 135 that corresponds to one of nodes 130*a*-130*x*, then result 110*a* is selected as final bucket assignment 115. Data object 120 is assigned to a node 130 corresponding to final bucket assignment 115, and a next data object may be processed by load balancer 105.

Otherwise, if result 110*a* indicates a bucket 135 that corresponds to one of nodes 130*x*+1 to 130*y*, then load balancer 105 determines a second result 110*b* that maps key 122 to one node of a first subset of buckets 135. A second hashing function 152 generates result 110*b* that is limited to a subset of buckets 135. This first subset of buckets 135 includes bucket 135*s* through node 130*x*, a final bucket of buckets 135. Buckets 135*a* through 130*s*-1 are omitted from the first subset. Function 152 is used to map a key to a particular one of a range of buckets. One property of function 152 is that it treats one particular bucket, in this example, the first bucket in the first range, different from the other buckets in the range. This property results in a probability of a given key being mapped to the first bucket in the first range being greater than a probability of the given key being mapped to any other bucket in the range. The first subset of buckets 135 maps to the range of buckets. Bucket 135*s* corresponds to a positive integer value, S, that represents the first bucket in the range. Accordingly, the value of S is based, at least in part, on the property of second hashing function 152. A probability of a given key being mapped to bucket 135*s* is, therefore, greater than a probability of the given key being mapped to any other bucket 135 within the first subset. To utilize function 152, load balancer 105 selects a value of S using T−1, where T is the largest power of two value that is less than N. If result 110b does not correspond to bucket 135s, then load balancer 105 selects result 110b as a final bucket assignment 115.

Otherwise, in response to determining that result 110b corresponds to bucket 135s within the first subset, load balancer 105 selects a third result 110c as the final bucket assignment 115, where result 110c is within a second subset of buckets 135. As disclosed, bucket 135s has a higher probability of being selected than the other buckets 135 in the first subset, and therefore, would not be uniformly assigned by function 152. If result 110b corresponds to bucket 135s, then load balancer 105 determines result 110c using a third hashing function 153, which selects from the second subset of buckets 135 that includes bucket 135a through bucket 135s. Function 153 makes a uniform selection from the second subset of buckets 135, and the result 110c is used as the final bucket assignment 115. In some embodiments, computer system 100 stores data object 120 using a particular node of nodes 130 that corresponds to the final bucket assignment 115. In other embodiments, data object 120 may be processed by the particular node corresponding to the final bucket assignment 115.

Use of the PowerHash algorithm may achieve O(1) complexity to assign a key, while at the same time exhibiting several other desirable traits, such as speed and scalability across a large range of bucket numbers. The disclosed technique does not build a mapping table for key lookup, thereby reducing a memory footprint while achieving a high scalability.

It is noted that FIG. 1 is merely an example for demonstrating the disclosed concepts. For example, nodes 130 are shown as being included within computer system 100. In other embodiments, nodes 130 may be external to computer system 100, and computer system 100 uses load balancer 105 to select a particular bucket 135 to determine which external node 130 to send data objects.

In FIG. 1, a load balancer process utilizes a hashing algorithm to assign keys to a particular bucket mapped to a corresponding node. Various hashing algorithms may be utilized, each having a particular set of properties. One example of a hashing algorithm is presented in FIG. 2. It is noted that the hashing algorithm shown in FIG. 2 is not limited for use with a load balancer as described in FIG. 1, but may be utilized for any suitable hashing use.

Figure 2:
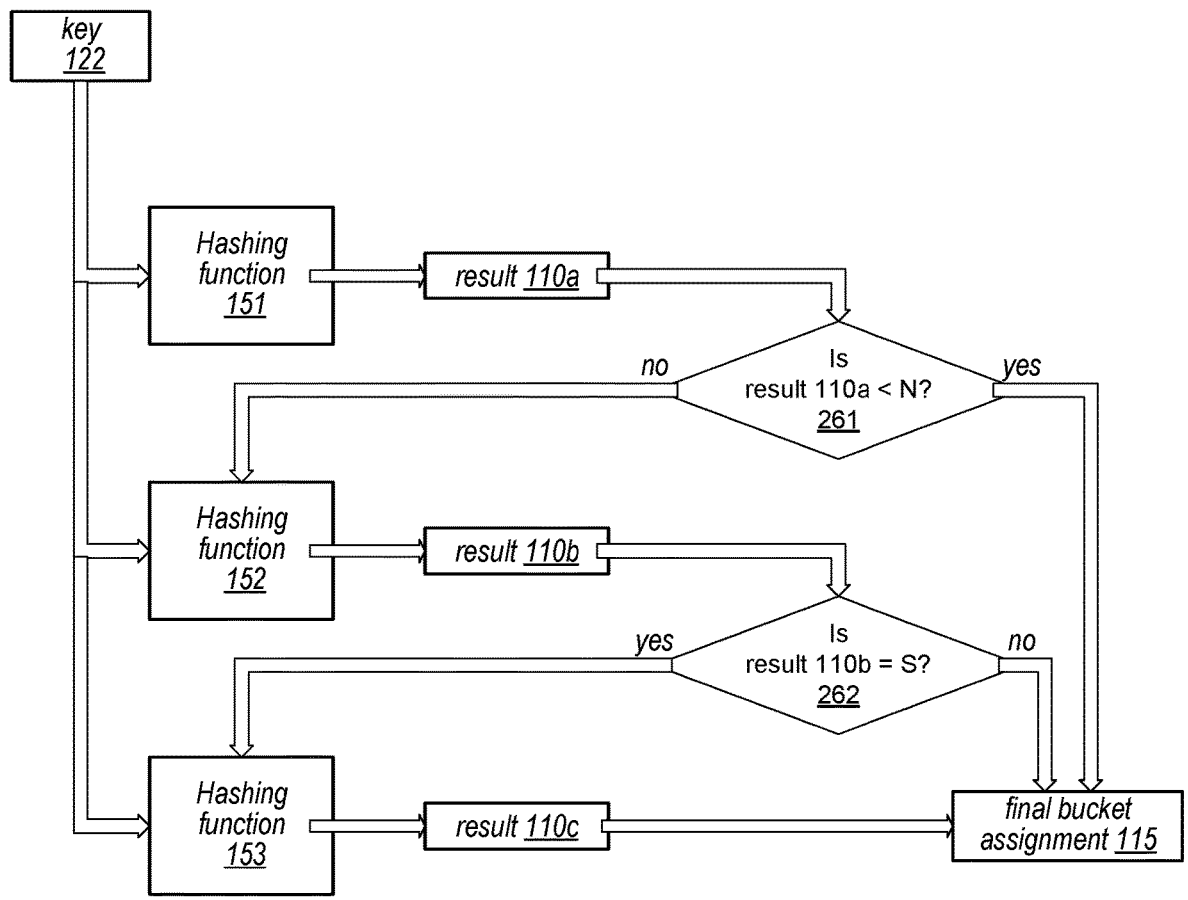
FIG. 2 is a flow diagram depicting an embodiment of a hashing algorithm operable on a computer system.

Moving to FIG. 2, a flow diagram illustrating the PowerHash algorithm for assigning a received key to one of a plurality of buckets is shown. Hashing algorithm 207 includes hashing functions 151, 152, and 153, each of which receives key 122 and generates a respective one of results 110a-110c. Hashing algorithm 207 selects one of results 110a-110c as final bucket assignment 115. In some embodiments, hashing algorithm 207 may be implemented as instructions stored on a non-transitory computer-readable medium, and be performed by computer system 100 to hash key 122 into one of N buckets.

As illustrated, hashing algorithm 207 receives key 122 which is passed to each of hashing functions 151, 152, and 153. Hashing functions 151, 152, and 153 each have a constant execution time and, in combination, uniformly distribute keys amongst the N buckets. As used herein, a "constant execution time" indicates that a time for each of hashing functions 151, 152, and 153, from receiving key 122 to generating the respective results 110a-110c, is the same, regardless of the number of buckets N. In some embodiments, the respective times for each of hashing functions 151, 152, and 153 to generate the corresponding result 110a-210c may differ from each other, but the respective times will remain constant for any suitable value of N. It is noted that suitable values of N may be constrained by a particular data type used to define N within the hashing functions 151, 152, and 153. For example, N may be defined as a 16-, 32-, or 64-bit positive integer in various embodiments. Accordingly, N may be constrained to values that are within range of the defined size.

Using hashing function 151, hashing algorithm 207 determines result 110a by hashing key 122 into one of M buckets, where M is a positive integer greater than or equal to N. To hash key 122 into one of the M buckets, as shown, hashing algorithm 207 invokes a call to hashing function 151, using key 122 and the number M as arguments to the function call. After completing, hashing function 151 returns the value of result 110a. In response to result 110a corresponding to one of the N buckets, hashing algorithm 207 assigns result 110a as final bucket assignment 115. As illustrated, in decision step 261, hashing algorithm determines if a value of result 110a is less than or equal to the number N. In some embodiments, decision step 261 may determine if the value of result 110a is in the range of zero to N−1, corresponding to N buckets numbered zero to N−1. If result 110a corresponds to one of the N buckets, then hashing algorithm 207 maps key 122 to result 110a as a final bucket assignment 115.

An example of a function that may be used as hashing function 151 includes selecting M as a smallest power of two value that is greater than or equal to N. For example, if N is 13, then M is selected to be 16, or 2^4, with the 16 buckets numbered 0 through 15. The M buckets are divided into a number of groups based on the power of 2 that is M. In this example, 4 is the power of 2 that equals 16, so 15 of the 16 buckets (bucket 0 is treated different, as will be detailed below) are divided into 4 groups, numbered 0 to 3. Group 0 includes bucket 1, group 1 includes buckets 2 and 3, group 2 includes buckets 4 to 7, and group 3 includes buckets 8 to 15. It is noted that a number of buckets included in each group is based on the group number and is determined by the formula $2^G$, where G is the respective group number associated with each group. Furthermore, a starting bucket number for each group is determined by the same formula, $2^G$. A number of bits of key 122 are taken as a key subset and used to assign key 122 into one of the 4 groups, where the number of bits is equal to the number of groups. In this example, the four least significant bits (key[0 . . . 3]) are used as the key subset to select one of the 4 groups. Key 122 is assigned to a group based on the most significant bit of the key subset that is set to a value of 1. If, for example, the bits for the key subset are [1, 0, 1, 0] (in order from bit 0 to bit 3), then the most significant value of 1 is in the bit 2 position and key 122 is assigned to group 2. The start bucket, H, for group 2 is identified using the $2^G$ formula, e.g., H=4 in this example. One of the buckets in group 2 is selected using equation (1).

$$B = H + (\text{rand}(K, G) \bmod H) \qquad (1)$$

The function call rand(K,G) returns a random number based on K (key 122) and the start bucket H for group 2. The mod operator returns a remainder of the random number divided by H. It is noted that rand(K,G) will return a same value for the same values of K and G. Accordingly, the bucket mapping will not change if hashing function 151 is repeated for a same value of key 122. A special case occurs when all bits of the key subset are 0, in which case the key is assigned to bucket 0.

If result 110a is otherwise outside of the range of the N buckets, then hashing algorithm 207 determines result 110b by hashing key 122 into a first range within the N buckets using hashing function 152. Hashing function 152 maps key 122 to a range of buckets from S to X, where a positive integer value S corresponds to a first bucket S in the range and X corresponds to the Nth bucket (bucket X). When using hashing function 152, a probability of a given key being mapped to bucket S within the first range is greater than a probability of the given key being mapped to remaining buckets within the first range (e.g., buckets S+1 to X). The probability of the given key being mapped to any of buckets S+1 to X, however, is equal. To hash key 122 into the first range of the N buckets, hashing algorithm 207 may invoke a call to hashing function 152, using key 122 and the number N and the number S as arguments to the function call. After completing hashing function 152 returns the value of result 110b.

For example, hashing function 152 uses three arguments: key 122, N, and S, where N is the number of buckets and S is the number of a first bucket in the first range of buckets. In the current example, S is selected based on the value of T−1, where T is the largest power of two value that is less than N. With the example of N=13, the value of T is determined as T=2^3=8. It is noted that T may also be determined using M, where T=M/2=16/2=8. The value of S in this example, is T−1 or 7. The example function generates a seed value using key 122 and then sets a loop variable J and a result variable B to the value of S. A random value R, based on the generated seed, is generated and then a new value of J is determined based on the current value of B and R. If the new value of J is equal to or greater than N, then the current value of B is returned as the assigned bucket. Otherwise, the loop is repeated by setting B=J, generating a new random value of R (using the same random number seed), and determining a new value of J based on B and the new value of R. The loop repeats until a value of J is equal to or greater than N. The value of B at this point is returned as the selected bucket for hashing function 152.

Hashing algorithm 207 assigns final bucket assignment 115 based on whether result 110b corresponds to bucket S. As shown, in decision point 262, hashing algorithm 207 compares the value of result 110b to a value corresponding to bucket S. In response to result 110b indicating a bucket other than bucket S, hashing algorithm 207 assigns result 110b as final bucket assignment 115. Otherwise, hashing algorithm 207 assigns result 110c as final bucket assignment 115, by hashing, using hashing function 153, key 122 into one of a second range of the N buckets. The second range of buckets includes a subset of the N buckets, including an initial one of the N buckets (e.g., bucket 0) up to bucket S. The subset has S+1 buckets. Hashing algorithm 207 may invoke a call to hashing function 153, using key 122 and the value of S+1 as arguments to the function call to hash key 122 into one of the second range of the N buckets. After completion, hashing function 153 returns the value of result 110c. As shown, hashing function 151 and hashing function 153 are a same function with different inputs, for example using the value S+1 in place of the value M to generate result 110c instead of result 110a. In other embodiments, hashing function 153 may utilize different formulas than function 151.

Hashing algorithm 207 may, in some embodiments, determine results 110a, 110b, and 210c in parallel. For example, after receiving key 122, hashing algorithm 207 may determine values for M and S, and then invoke calls to hashing functions 151, 152, and 153 in parallel. It is noted that, as used herein, "parallel" refers to operations being performed in an overlapping manner. "Parallel" is not intended to imply that operations must begin and/or end at a same time, although such occurrences are contemplated. For example, hashing algorithm 207 may invoke the call to hashing function 151 and then invoke the call to hashing function 152 while computer system 100 is performing instructions corresponding to hashing function 151. Similarly, hashing algorithm 207 may invoke the call to hashing function 153 after the call to hashing function 152 has been made. In other embodiments, hashing algorithm 207 may be performed across three or more processor cores, or three or more computing devices. In such embodiments, the calls to each of hashing functions 151-153 may be made simultaneously.

When hashing functions 151-153 are performed in parallel, hashing algorithm 207 may evaluate result 110a first, as described above, and then evaluate result 110b only if result 110a does not correspond to one of the N buckets. Similarly, result 110c may only be utilized if result 110b is evaluated and corresponds to bucket S.

It is noted that the hashing algorithm presented in FIG. 2 is an example. Only elements necessary to demonstrate the disclosed concepts have been included. The illustrated processing flow may be different in other embodiments. For example, although the key is shown as being distributed to the three hashing functions in parallel, in some embodiments, the key may be passed to each hashing function during a respective process call.

FIGS. 1 and 2 illustrate, respectively, a system and an algorithm for hashing keys to particular buckets, and then further to nodes. Charts illustrating how various hashing functions perform the mapping are shown in FIG. 3.

Turning to FIG. 3, three charts corresponding to the three hashing functions shown in FIG. 2 are depicted. Chart 300 corresponds to hashing function 151, chart 320 corresponds to hashing function 152, and chart 340 corresponds to hashing function 153. The x-axis of each chart lists a number of buckets to which a given key is to be mapped. The y-axis indicates a probability of the given key being mapped to the respective bucket. All three charts correspond to an example in which a number of buckets 135 is twelve (N=12).

As illustrated, chart 300 corresponds to hashing function 151. The twelve buckets 135 are numbered on the x-axis from '0' to '11,' making bucket 11 the twelfth bucket. Based on the value of 12 for N, hashing algorithm 207 selects a value of 16 for M, the smallest power of two value greater than 12. Buckets 135 that are numbered 12 through 15 correspond to invalid bucket results 337. After receiving key 122, hashing algorithm 207 calls hashing function 151 using key 122 and '16' as arguments. A given value of key 122 has an equal probability of being mapped to any of buckets 0-15. Hashing function 151, however, is repeatable, such that a same value of key 122 will always be mapped to the same bucket. If hashing function 151 returns a number in the range of 0-11 as result 110a, then result 110a is assigned as final bucket assignment 115 and hashing algorithm 207 is complete for key 122.

Otherwise, if the value of result 110a is in the range of 12-15, result 110a is not assigned as final bucket assignment 115 and hashing algorithm 207 calls hashing function 152. Chart 320 depicts operation of hashing function 152. To perform hashing function 152, an integer value of T is selected using a largest power of two value that is less than 12, i.e., 8. Since the numbering of buckets 135 begins at '0,' the eighth bucket is bucket 7 and S is, in the illustrated example, set using S=T−1=7. As shown, hashing function 152 is called by hashing algorithm 207 using key 122, '12,' and '7' as arguments. These values establish a first range of buckets 135 from bucket 7 to bucket 11. Of the five of buckets 135 in the first range, bucket 7 is special due to having a higher probability of a given value of key 122 being mapped to it than the probability of the given value being mapped to any one of buckets 8 through 11. Generally speaking, with twelve buckets, a given value of key 122 has a 1-in-12 (8.3%) chance of being mapped to any one bucket. Using hashing function 152 however, a given value of key 122 has an 8.3% chance of being mapped to any of buckets 8-11, and an 8-in-12 (~66.7%) chance of being mapped to bucket 7. Bucket 7 captures all values of key 122 that will be mapped to buckets 0-7 when using hashing function 153 in a next step of hashing algorithm 207. An equal probability is maintained for a given value of key 122 to be mapped to any of buckets 0-11.

If hashing function 152 returns a number in the range of 8-11 for result 110b, then result 110b is assigned as final bucket assignment 115 and hashing algorithm 207 is complete for key 122. Otherwise, if result 110b is 7, result 110b is not assigned as final bucket assignment 115 and hashing algorithm 207 calls hashing function 153. As shown in chart 340, values of key 122 that are mapped to bucket 7 by hashing function 152 are remapped to one of buckets 135 in a second range of 0 through 7. It is noted that the value of S(=7) represents a lower limit of the first range and an upper limit of the second range. Hashing algorithm 207 calls hashing function 153 using key 122 and '8' as the arguments. With the eight buckets in the second range of buckets 135, hashing function 153 has a 1-in-8 (12.5%) chance of mapping a given value of key 122 to any particular bucket in the second range. Hashing function 153 returns a number for result 110c which hashing algorithm 207 assigns as final bucket assignment 115 and hashing algorithm 207 is complete for key 122.

In some embodiments, hashing function 151 and hashing function 153 are a same function with different inputs. For example, hashing functions 151 and 153 may correspond to a same or similar function that maps a given key 122 uniformly to any power of two number of buckets.

It is noted that the charts of FIG. 3 are an example for describing the disclosed subject matter. Although the example includes twelve buckets, in other embodiments, any suitable number of buckets may be used.

Figure 4:
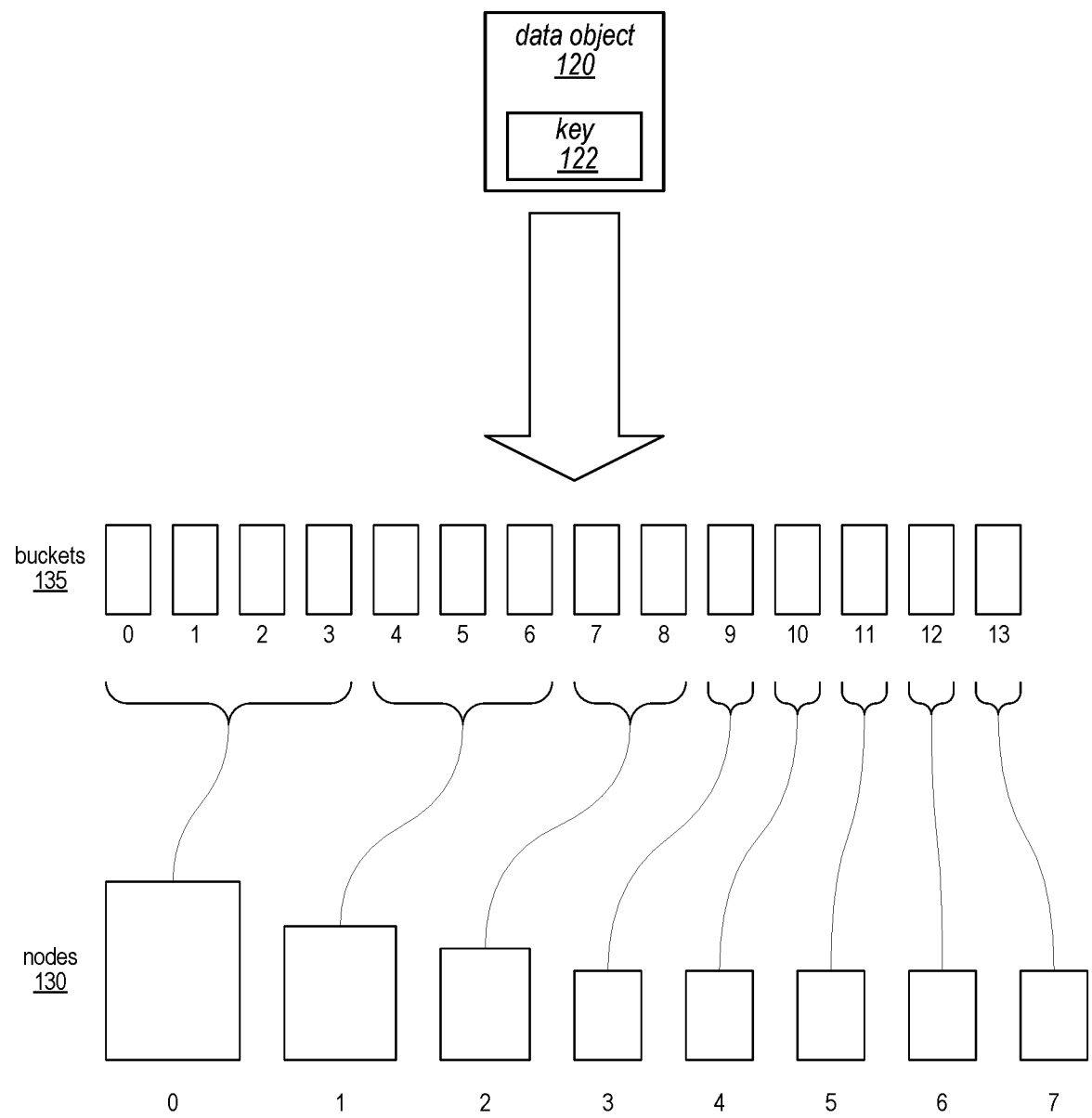
FIG. 4 illustrates an embodiment of a weighted mapping of buckets to nodes.

The systems and algorithms presented in FIGS. 1-3 describe techniques for mapping a key to one of a number of buckets. The buckets may be further mapped to corresponding nodes. Mapping between buckets and nodes may be performed in a variety of manners. FIG. 4 illustrates one such manner.

Proceeding to FIG. 4, a diagram depicting a mapping between a number of buckets and a different number of nodes is shown. FIG. 4 illustrates how a data object may be mapped to one of a number of nodes such that the mapping is weighted for particular nodes. FIG. 4 includes data object 120 mapped into one of fourteen buckets 135 using key 122. The fourteen buckets 135 are then mapped into eight nodes 130.

In some embodiments, it may be desirable to weight the mapping of keys to one or more of nodes 130. For example, if nodes 130 correspond to a plurality of storage devices, certain ones of the storage devices may have more capacity than others, and therefore, more data items are mapped to those storage devices. As another example, if nodes 130 correspond to a plurality of computing devices, certain ones of the computing devices may have a higher bandwidth than others, allowing the higher bandwidth devices to process more data items.

To weight one or more nodes, hashing algorithm 207 maps each of an N number of buckets to one of a P number of nodes, where the value of P is less than the value of N, and where at least one of the P nodes is mapped from more of the N buckets than another one of the P nodes. In the example of FIG. 4, N is fourteen and P is eight. As a first step in the mapping process, hashing algorithm 207 maps data object 120 to one of buckets 135 using key 122 using a process as described above. This first step results in key 122 being mapped to one of buckets 135 where a given value of key 122 has an equal probability of being mapped to any one of the fourteen buckets 135. Hashing algorithm 207 further maps each of the fourteen buckets 135 to a corresponding one of the eight nodes 130. As shown, four buckets are mapped to node 0, three buckets to node 1, two buckets to node 2, and one bucket apiece to each of nodes 3-7. Accordingly, a given value of key 122 is four times more likely to be mapped to node 0 than to one of nodes 3-7.

It is noted that FIG. 4 is one example of a weighted mapping scheme for assignment of data objects to nodes. In other embodiments, different numbers of buckets and nodes may be used to achieve a desired weighting to each node.

The systems and algorithms presented in FIGS. 1-4 describe techniques for mapping a key to one of a number of buckets and, in some embodiments, further mapping the buckets to a number of nodes. The systems and algorithms described herein may perform the mappings using a variety of methods. Two such methods for mapping keys to buckets are described in FIGS. 5 through 7.

Moving now to FIG. 5, a flow diagram illustrating an example method 500 for mapping a received key to one of N buckets is depicted, according to some embodiments. The method of FIG. 5 shows a particular path through the PowerHash algorithm based on particular results. It is noted that, in other cases, a different path may be observed. In various embodiments, all or a portion of method 500 may be performed by computer system 100 of FIG. 1 to (or any other suitable computer system), for example, assign a data object to a particular one of a plurality of buckets. In such embodiments, computer system 100 may include (or have access to) a non-transitory, computer-readable medium having program instructions stored thereon that are executable by the computer system to cause the operations described with reference to FIG. 5. Referring collectively to FIGS. 1, 2, 3, and 5, method 500 begins in block 501. As with all flow diagrams shown herein, additional steps and techniques may be used in various embodiments, and thus the presence of a "start" and "end" block within the flowchart does not preclude other operations beyond those illustrated.

At block 510, method 500 includes receiving, by computer system 100, key 122 associated with data object 120 to be associated with one of N buckets 135. As shown, computer system 100 receives key 122 and maps key 122 to one of buckets 135. Each of buckets 135 may be further mapped to a corresponding one of nodes 130. In various embodiments, nodes 130 may correspond to data storage devices, processing cores, computing devices, or any similar devices. Computer system 100 maps key 122 to one of the N buckets using hashing algorithm 207.

Method 500 further includes, at block 520, determining, by computer system 100, a first result using hashing function 151 to hash key 122 into one of M buckets, where M is an integer greater than or equal to N. As illustrated, hashing algorithm 207 selects a value of M that is a smallest power of two integer that is greater than or equal to N (e.g. if N is 23 then M may be 32). Hashing algorithm 207 calls hashing function 151 using key 122 and 'M' as arguments. Hashing function 151 maps key 122 to one of M buckets, with each of the M buckets having a same probability of being mapped from a given value of key 122. Result 110a is returned by hashing function 151 as a first result.

The method also includes, at block 530, in response to determining that result 110a is greater than or equal to N, determining, by the computer system, a second result 110b by hashing key 122 into a first range within the N buckets using hashing function 152. Hashing algorithm 207 determines an initial value for the first range, S, based on the value of T−1, where T is the largest power of two value that is less than N. The first range includes buckets from bucket S to a last bucket of the N buckets (e.g., bucket N−1). A probability of a given value of key 122 being mapped to bucket S within the first range is greater than a probability of the given value of key 122 being mapped to remaining buckets within the first range. For example, the probability that a given value of key 122 is mapped to bucket S may be equal to S+1 times the probability that the given value is mapped to any other bucket in the first range. Hashing algorithm 207 calls hashing function 152 using key 122, 'N', and 'S' as arguments. Result 110b is returned by hashing function 152 as a result.

At block 540, method 500 further includes, in response to determining that result 110b corresponds to bucket S, assigning, by computer system 100, data object 120 to a third result (result 110c) by hashing key 122 into a second, different, range of the N buckets using hashing function 153. As illustrated, the second range of buckets includes buckets from bucket 0 to bucket S. There are S+1 buckets in the second range. Hashing algorithm 207 determines that result 110b corresponds to bucket S. In response, hashing algorithm 207 calls hashing function 153 using key 122 and a value based on 'S+1' to generate a third result, result 110c. The call to hashing function 153 maps key 122 to a bucket in the second range. Hashing function 153 has an equal probability of mapping a given value of key 122 to each of the buckets int the second range. Hashing algorithm 207 receives result 110c from hashing function 153 and assigns this value as final bucket assignment 115. The method ends in block 590.

It is noted that in FIG. 5, method 500 includes elements 501-590. While these elements are shown in a serial order for ease of understanding, other orders may be used. In various embodiments, some of the method elements may be performed concurrently, in a different order than shown, or may be omitted. Additional method elements may also be performed as desired. For example, each of hashing functions 151-153 may be performed concurrently by computer system 100.

It is further noted that method 500 may be repeated to assign other received keys. In some embodiments, a number of nodes may change between receiving various keys to be assigned. For example, nodes may be added, changing the number of nodes from N to N'. If the value of N' is a power of two value, then hashing algorithm 207 may assign a received key to a particular one of the N' nodes using only hashing function 151.

Figure 6:
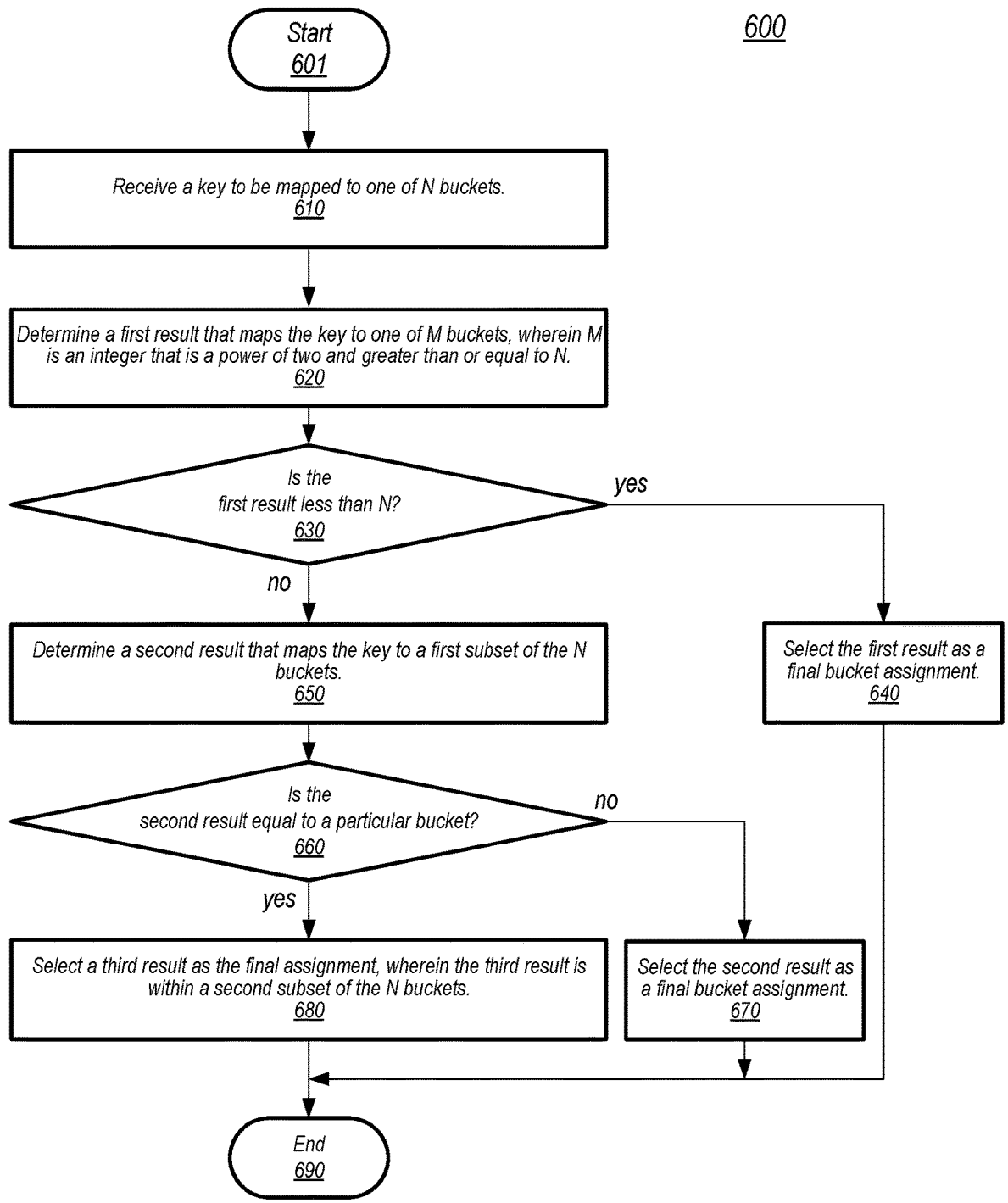
FIG. 6 depicts a flow diagram of an embodiment of a method for mapping keys to buckets.

Turning now to FIG. 6, a flow diagram for an embodiment of a method for mapping a key to one of a number of buckets is shown. Method 600 may, in some embodiments, be performed by computer system 100 of FIG. 1 to, for example, assign data objects to various nodes. Computer system 100 may include (or have access to) a non-transitory, computer-readable medium having program instructions stored thereon that are executable by the computer system to cause the operations described with reference to FIG. 6. Referring collectively to FIGS. 1 and 6, method 600 begins in block 601.

Method 600, at block 610, includes receiving key 122 to be mapped to one of an N number of buckets. Computer system 100 uses key 122 to select one of N buckets 135 that includes bucket 135a to bucket 135x. Bucket 135a corresponds to an initial bucket of buckets 135 and bucket 135x corresponds to a final bucket of buckets 135. As illustrated, computer system 100 performs a uniform distribution of a number of keys across buckets 135 so as a number of keys mapped becomes greater than N, the keys are evenly distributed across buckets 135, thereby reducing a likelihood of any one of buckets 135 being overloaded while other ones of buckets 135 are underutilized.

At block 620, method 600 further includes determining result 110a that maps key 122 to one of M buckets, where M is an integer that is a power of two and greater than or equal to N. As shown, load balancer 105 determines a number M that is greater than or equal to N, the number of buckets 135. Computer system 100 maps key 122 to one of the M number of buckets, which includes all valid buckets 135a to 135x plus one or more invalid buckets 135x+1 to 135y. For a given value of key 122, result 110a has an equal probability of being any integer value in a range of M integers. For example, from '0' to 'M−1' or from '1' to 'M.' Each integer value corresponds to one of the M number of buckets.

Further operations of method 600, from block 630, are dependent on the value of result 110a. Computer system 100, as depicted, determines if the value of result 110a corresponds to one of the valid buckets 135a to 135x, or to one of the invalid buckets 135x+1 to 135y. If result 110a corresponds to a valid bucket, the method moves to block 640 to select result 110a. Otherwise, method 600 moves to block 650 to determine result 110b.

At block 640, method 600 includes selecting result 110a as a final bucket assignment. If result 110a corresponds to one of the valid buckets 135a-135x, then computer system 100 assigns data object 120 to the corresponding bucket. The method ends in block 690.

Method 600 moves to block 650 if result 110a corresponds to one of the invalid buckets 135x+1 to 135y. At block 650, the method further includes determining result 110b that maps key 122 to a first subset of the N buckets 135. Load balancer 105, as shown, determines a first subset of buckets 135a-130x by determining a number T that is a largest power of two value that is less than N. The subset of buckets 135a-130x includes buckets 135s to 135x, where bucket 135s is the T-th bucket from the initial bucket 135a. For example, if T is 16, then bucket 135s is the 16th bucket. Computer system 100 determines result 110b by hashing key 122 into a value corresponding to one of the buckets in the first subset of buckets 135. A given value of key 122 has a higher probability of being mapped to bucket 135s than to any of the other buckets in the first subset.

Further operations of method 600, from block 660, are dependent on the value of result 110b. Computer system 100, as illustrated, determines if the value of result 110b corresponds to one of buckets 135s+1 to 135x, or to bucket 135s. If result 110b corresponds to bucket 135s, the method moves to block 680 to determine result 110c. Otherwise, method 600 moves to block 670 to select result 110b.

At block 670, method 600 includes selecting result 110b as a final bucket assignment. If result 110b corresponds to one of the buckets in the first subset other than bucket 135s, then computer system 100 assigns key 122 to the corresponding bucket as the final bucket assignment. The method ends in block 690.

If result 110b corresponds to bucket 135s, then method 600 moves to block 680. At block 680, method 600 includes selecting result 110c as the final bucket assignment, where result 110c is within a second subset of the N buckets 135. Computer system 100 includes buckets 135a to 135s in the second subset of buckets. Result 110c is determined by hashing key 122 to a value corresponding to one of the buckets in the second subset of buckets 135. Computer system 100 assigns key 122 to the corresponding bucket as the final bucket assignment. The method ends in block 690.

In some embodiments, the final bucket assignment may be used to store data object 120 using a particular node of the N nodes that corresponds to the final assignment. As illustrated, computer system 100 assigns data object 120 to one of nodes 130 that corresponds to the final bucket assignment.

It is noted that method 600 is merely an example for demonstrating disclosed concepts. While the illustrated operations are shown in a particular order for ease of understanding, other orders may be used. In some embodiments, for example, results 110a, 110b, and 110c may be determined in parallel by computer system 100.

Figure 7:
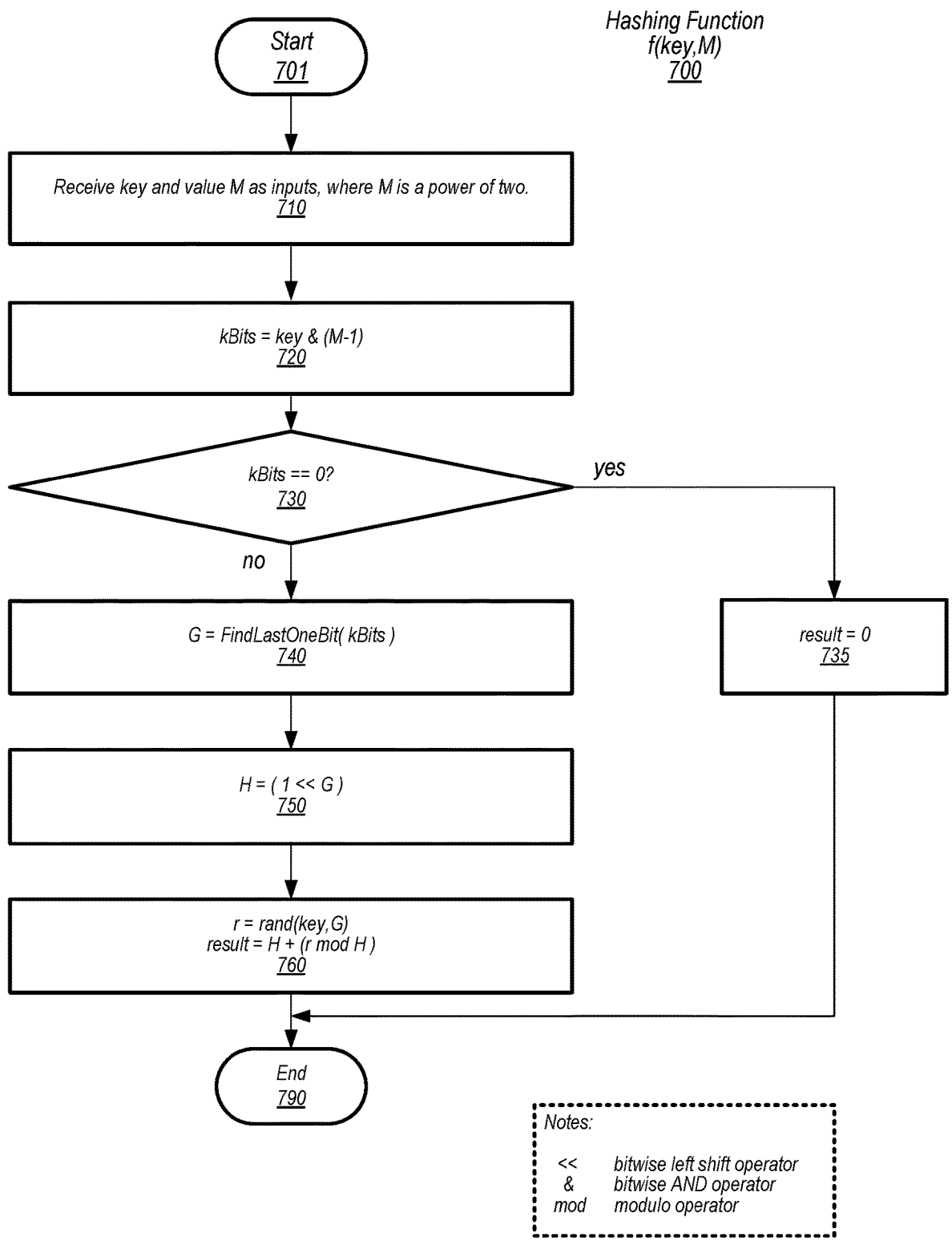
FIG. 7 illustrates a flowchart of an embodiment of a hashing function that may be used as part of a hashing algorithm.

Proceeding now to FIG. 7, a flow chart of an embodiment of a hashing function for mapping a key to one of an M number of buckets is illustrated. Hashing function 700 may be used as hashing function 151 and/or 153 in FIGS. 1 and 2. In various embodiments, hashing function 700 may be implemented as a software module performed by computer system 100 of FIG. 1, may be implemented as hardware using combinational logic circuits, or may be implement using a combination thereof. Referring collectively to FIGS. 2 and 7, hashing function begins in block 701.

As illustrated, hashing function 700, at block 710 receives key 122 and a value M, where M is a power of two. Hashing function 700 determines a result bucket by hashing key 122 into one of M buckets. For example, if M is 16, or 2^4, then the 16 buckets may be numbered 0 through 15. To hash key 122 into one of the M buckets, as shown, hashing function 700 divides the M buckets into a number of groups based on the power of 2 that is M. In other words, the number of groups, I, is equal to the base 2 logarithm of M (I=log$_2$(M)). In this example, the log$_2$(16) is 4, so 15 of the 16 buckets (bucket 0 is treated different, as will be detailed below) are divided into 4 groups, each with a corresponding group number, G. The four values for G range from 0 to 3. Group 0 includes bucket 1, group 1 includes buckets 2 and 3, group 2 includes buckets 4 to 7, and group 3 includes buckets 8 to 15. It is noted that a number of buckets included in each group is based on the group number and is determined by the formula 2^G. Furthermore, a starting bucket number for each group is determined by the same formula, 2^G.

At block 720, a number of bits of key 122 are taken as a key subset, where the number of bits is equal to the number of groups. Hashing function 700 uses equation (2) to extract the number of bits from key 122.

$$kBits = key\ \&\ (M-1) \qquad (2)$$

In this example, kBits is equal to the value of the four least significant bits (key[0 . . . 3]). Key 122 is assigned to a group based on the most significant bit of kBits that is set to a value of 1. If, at block 730, kBits is equal to zero, then bucket 0 is selected as the result in block 735 and the function ends in block 790.

Otherwise, if kBits includes at least one bit that is set to '1,' then hashing function 700, at block 740, identifies the most significant bit that is set to '1.' To identify this bit, the function FindLastOneBit(kBits) is used. This function returns an integer value that indicates the most significant bit position with a value of '1.' For example, if the bits for kBits are [1, 0, 1, 0] (in order from bit 0 to bit 3), then the most significant value of 1 is in the bit 2 position. The value of G is set to two and key 122 is assigned to group 2.

After the group is selected, hashing function 700 selects a particular bucket within the selected group (group 2). At block 750, a start bucket, H, for group 2 is identified using equation (3).

$$H = (1 << G) \qquad (3)$$

In this example, '1' is left shifted two places, resulting in a value of four, indicating that bucket 4 is the starting bucket H for group 2. Hashing function 700 then, at block 760, uses equations (4) and (5) to determine a bucket within group 2, starting with bucket H.

$$r = \text{rand}(key, G) \qquad (4)$$

$$\text{result} = H + (r\ \text{mod}\ H) \qquad (5)$$

The function call rand(key,G) returns a pseudo-random number based on key 122 and the value of the selected group (e.g., 2). The function (r mod H) returns a remainder from dividing the random number by H. It is noted that rand(key, G) will return a same pseudo-random value for the same values of key 122 and G. Accordingly, the bucket mapping will not change if hashing function 700 is repeated for a same value of key 122.

In summary, hashing function 700, receives a key and a value for M, where M is a power of two value. Hashing function 700 divides the M buckets into a number of groups. The number of groups is based on log$_2$(M). For example, if M=16, then the number of groups is 4. A number of the M buckets that are mapped into each group is based on a group number, G, for the group. For example, group 3 includes 2^3=8 buckets. Hashing function 700 selects a particular group number for the key using a subset of bits of the key, where the number of bits in the subset is based on the number of groups, e.g., for the 4 example groups, 4 bits of the key are used, each bit corresponding to one group. Hashing function 700 determines a most significant bit with a value of '1' from the 4 bits of the key, and the determined bit indicates the particular group number to select. For example, if the four bits of the key have the values [0, 0, 1, 0] (in order from bit 0 to bit 3), then the most significant value of 1 is in the bit 2 position, indicating group 2. Using a pseudo-random value based on the key and a number corresponding to an initial bucket in the particular group number, hashing function 700 determines a bucket for the key. For the indicated group 2, the initial bucket is bucket 4. A pseudo-random value is generated using the key and the number 4. One of the four buckets in group 2 (bucket 4 to bucket 7) is selected using the pseudo-random value.

As noted, the number of buckets that a key is to be mapped to may change over time, thus N might be updated to N', for instance. For scenarios in which the number of buckets that an object is to be mapped to is equal to a power of two, hashing function 700 may be performed once to assign the object to one of the N' buckets without having to perform additional processing as discussed above with respect to FIGS. 1 and 2.

FIG. 7 demonstrates one example of a hashing function that may be utilized to map a key to a bucket. It is noted that hashing function 700 has a constant time complexity allowing for buckets to be assigned within a consistent and predictable amount of time. Hashing function 700 also generates a repeatable value, allowing a given value of a key to be remapped to a same bucket without having to record and maintain a list of previous assignments. Although disclosed in combination with an algorithm for assigning a key to one of a positive integer number of buckets, hashing function 700 may also be used in embodiments other than those illustrated in FIGS. 1 and 2.

Figure 8:
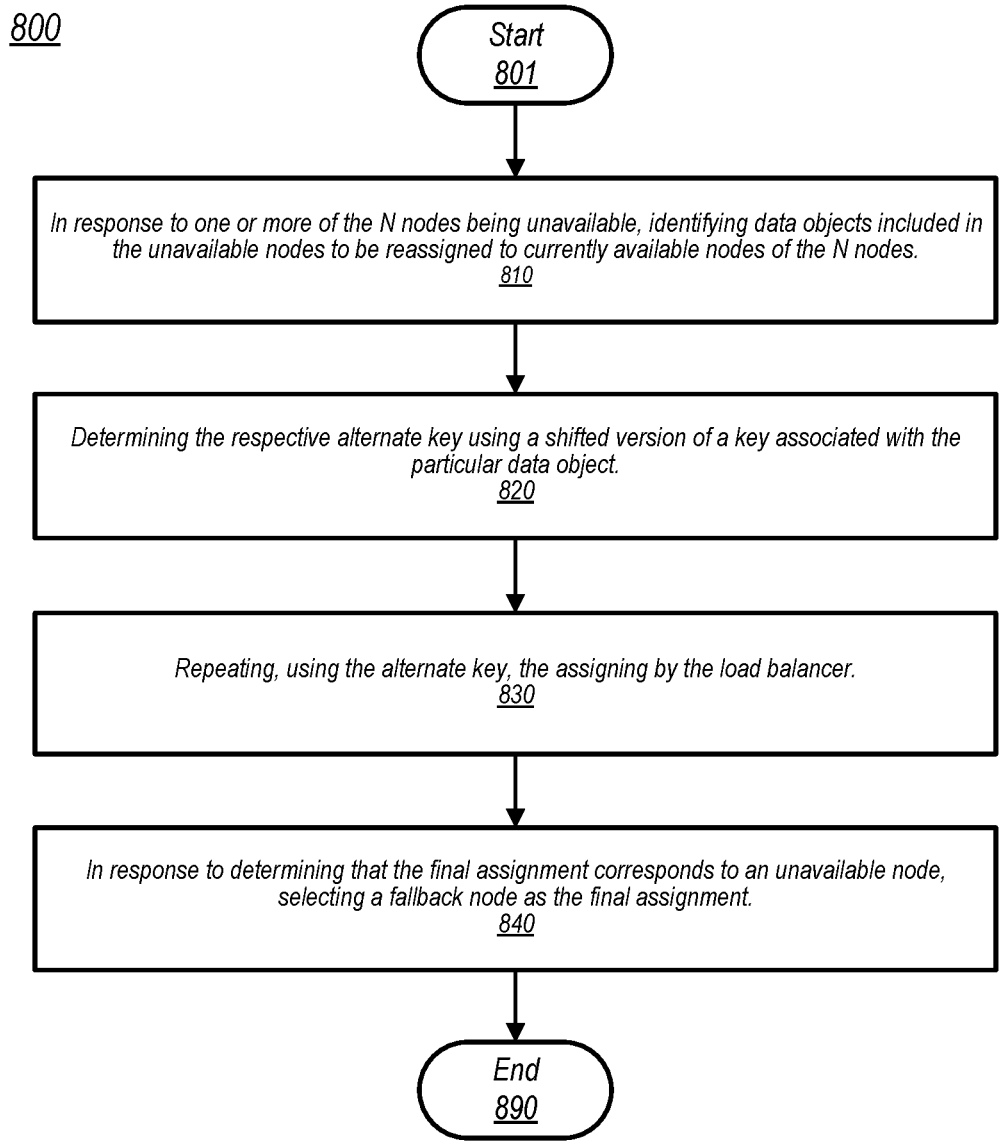
FIG. 8 shows a flow diagram of an embodiment of a method for rehashing key assignments in response to one or more buckets becoming unavailable.

Moving to FIG. 8, a flow diagram of an embodiment of a method for remapping an assigned key in response to a corresponding node becoming unavailable is shown. Method 800 may be performed by computer system 100 of FIG. 1 to, for example, in response to a particular one of a plurality of nodes being taken offline. Computer system 100 may include (or have access to) a non-transitory, computer-readable medium having program instructions stored thereon that are executable by the computer system to cause the operations described with reference to FIG. 8. Referring collectively to FIGS. 1, and 8, method 800 begins in block 801 after one or more data objects have been assigned to one or more of nodes 130, for example, after method 600 has been performed at least once.

Method 800 includes, at block 810, in response to one or more of nodes 130 being unavailable, identifying data objects included in the unavailable nodes to be reassigned to currently available nodes of nodes 130. A particular node may be removed, for example, due to a malfunction or for maintenance. As illustrated, load balancer 105 identifies one or more assignments that are made to the unavailable node (e.g., node 130*b*), and determines to reassign the identified data objects to other nodes that are still available (e.g., node 130*a* and nodes 130*c*-130*x*). In addition, any newly received data objects receiving an initial assignment that corresponds to node 130*b* may be reassigned using method 800.

At block 820, method 800 also includes determining the respective alternate key using a shifted version of a key associated with the particular data object. To reassign a data object that has been assigned to an unavailable bucket that is mapped to the unavailable node 130*b*, load balancer 105 determines an alternate key using the original key for the data object. As illustrated, load balancer 105 shifts the original key to generate the alternate key. For example, an original key with a hexadecimal value of 0x1234ABCDE may be shifted to generate a hexadecimal value of 0xABCDE1234 for the alternate key. Other methods for generating the alternate key are contemplated, such as performing a two's complement of the original key, performing a bitwise exclusive OR between a predetermined value and the original key, and the like.

Method 800, at block 830, further includes repeating, using the alternate key, the assigning by load balancer 105. Load balancer 105 repeats the assigning process described in regards to FIG. 1, using the alternate key in place of the original key. Functions 151, 152, and 153 may, in turn, be called using the alternate key. Values for N, M, and S, however, may remain the same as from the original assignment using the original key.

At block 840, the method also includes, in response to determining that the final assignment corresponds to an unavailable node, selecting a fallback node as the final assignment. As shown, load balancer 105 uses the alternate key to reassign the identified data object to a different one of nodes 130. If, however, the reassignment results in the unavailable node (e.g., node 130*b*), then load balancer 105 assigns the identified data object to a different one of nodes 130, referred to herein as a "fallback node." Buckets that are associated with respective ones of the fallback nodes are similarly referred to as "fallback buckets." In some embodiments, a small set of dedicated nodes, separate from nodes 130, may be used as fallback nodes. In other embodiments, load balancer 105 may determine that a subset of available nodes 130 have more available bandwidth/storage space than the other nodes 130 and then select one of the subset of nodes as the fallback. The method ends in block 890.

It is noted that method 800 of FIG. 8 is an example. Method 800 may be applied to data objects that have previously been assigned to a node that becomes unavailable, as well as to newly received data objects being assigned for a first time. Method 800 may be repeated for additional data objects identified for reassignment.

Figure 9:
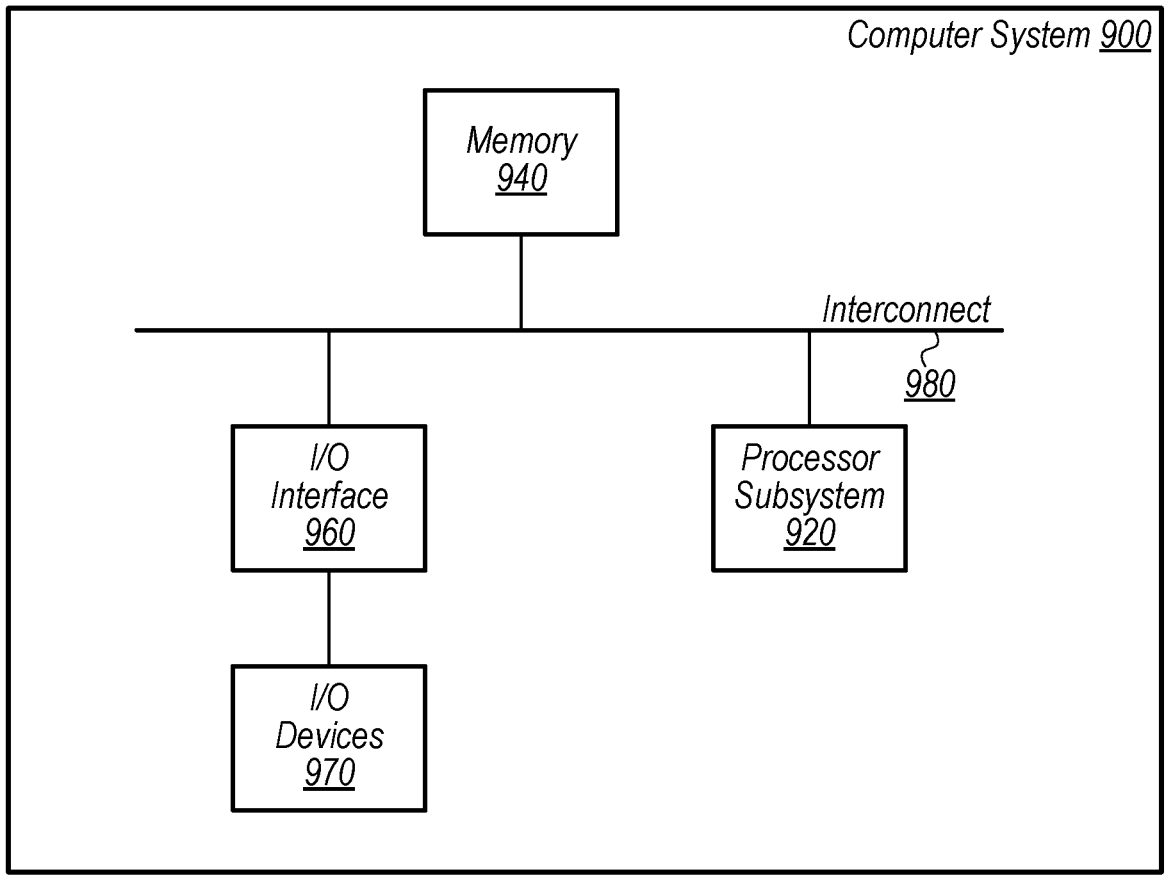
FIG. 9 is a block diagram illustrating an example computer system, according to some embodiments.

Referring now to FIG. 9, a block diagram of an example computer system 900 is depicted, which may correspond to computer system 100 of FIG. 1, in whole or in part, according to various embodiments. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 perform various operations described herein. System memory 940 may be implemented using different physical, non-transitory memory media, such as hard disk storage, floppy disk storage, removable disk storage, flash memory, random-access memory (RAM—SRAM, EDO RAM, SDRAM, DDR SDRAM, RAMBUS RAM, etc.), read-only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having instructions stored thereon that are executable by a computer system to perform operations comprising:
   receiving, by a load balancer executing on the computer system, a key associated with a data object;
   assigning, by the load balancer, the data object to one of N nodes by:
      determining a first result that maps the key to one of M nodes, wherein M is an integer that is a power of two and greater than or equal to N;

in response to determining that the first result is less than N, selecting the first result as a final assignment; otherwise:
  determining a second result that maps the key to a first subset of the N nodes;
  in response to determining that the second result corresponds to a particular node within the first subset, selecting a third result as the final assignment, wherein the third result is within a second subset of the N nodes; and
  otherwise, selecting the second result as the final assignment; and
storing the data object using a given node of the N nodes that corresponds to the final assignment.

2. The non-transitory computer-readable medium of claim 1, wherein the first subset of the N nodes includes a node S through a final node of the N nodes, and wherein the particular node corresponds to node S.

3. The non-transitory computer-readable medium of claim 2, wherein the operations further comprise selecting a value of S using a largest power of two value that is less than N.

4. The non-transitory computer-readable medium of claim 2, wherein a probability of a given key being mapped to node S is greater than a probability of the given key being mapped to any other node within the first subset.

5. The non-transitory computer-readable medium of claim 2, wherein the second subset of the N nodes includes node S.

6. The non-transitory computer-readable medium of claim 1, wherein the operations further comprise, in response to one or more of the N nodes being unavailable, reassigning, using respective alternate keys, data objects included in unavailable nodes to currently available nodes of the N nodes.

7. The non-transitory computer-readable medium of claim 6, wherein reassigning a particular data object includes determining the respective alternate key using a shifted version of a key associated with the particular data object.

8. The non-transitory computer-readable medium of claim 7, wherein reassigning the particular data object further includes:
  repeating, using the respective alternate key, the assigning by the load balancer; and
  in response to determining that the final assignment corresponds to an unavailable node, selecting a fallback node as the final assignment.

9. A non-transitory computer-readable medium having instructions stored thereon that are executable by a computer system to hash a key into one of N buckets by performing operations comprising:
  determining a first result by hashing, using a first hashing function, the key into one of M buckets, wherein M is an integer greater than or equal to N; and
  assigning a final bucket by:
    in response to the first result corresponding to one of the N buckets, assigning the first result as the final bucket; and
    otherwise:
      determining a second result by hashing the key into a first range within the N buckets using a second hashing function in which a probability of a given key being mapped to a bucket S within the first range is greater than a probability of the given key being mapped to remaining buckets within the first range; and
      assigning the final bucket based on whether the second result corresponds to bucket S.

10. The non-transitory computer-readable medium of claim 9, wherein assigning the final bucket based on whether the second result corresponds to bucket S comprises:
  in response to the second result indicating a bucket other than bucket S, assigning the second result as the final bucket; and
  otherwise, assigning a third result as the final bucket, by hashing, using a third hashing function, the key into one of a second range of the N buckets.

11. The non-transitory computer-readable medium of claim 10, wherein a value of S is a lower limit of the first range and an upper limit of the second range.

12. The non-transitory computer-readable medium of claim 10, wherein the first, second, and third hashing functions each have a constant execution time and, in combination, uniformly distribute keys among the N buckets.

13. The non-transitory computer-readable medium of claim 10, wherein the first hashing function and the third hashing function are a same function with different inputs.

14. The non-transitory computer-readable medium of claim 9, wherein the operations further comprise:
  selecting a value of M using a smallest power of two value that is greater than or equal to N; and
  selecting a value of S using a largest power of two value that is less than N.

15. The non-transitory computer-readable medium of claim 9, wherein the operations further comprise mapping each of the N buckets to one of P nodes, wherein a value of P is less than a value of N, and wherein at least one of the P nodes is mapped from more of the N buckets than another one of the P nodes.

16. A method comprising:
  receiving, by a computer system, a key associated with a data object to be assigned to one of N buckets;
  determining, by the computer system, a first result using a first hashing function to hash the key into one of M buckets, wherein M is an integer greater than N;
  in response to determining that the first result is greater than N, determining, by the computer system, a second result by hashing the key into a first range within the N buckets using a second hashing function in which a probability of a given key being mapped to a bucket S within the first range is greater than a probability of the given key being mapped to remaining buckets within the first range; and
  in response to determining that the second result corresponds to bucket S, assigning, by the computer system, the data object to one particular bucket of a second, different, range of the N buckets by hashing the key using a third hashing function to generate a third result.

17. The method of claim 16, further comprising:
  selecting a value of M that is based on a smallest power of two value that is greater than N; and
  selecting a value of S that is based on a largest power of two value that is less than N.

18. The method of claim 16, further comprising, in response to a removal of one or more of the N buckets, reassigning, using respective alternate keys, data objects included in unavailable buckets to one of a set of fallback buckets, different from the N buckets.

19. The method of claim 16, further comprising:
  receiving, by the computer system, a second key associated with a second data object to be assigned to one of N' buckets, wherein N' is an updated value of N that is equal to a power of two;
  performing, by the computer system, the first hashing function to obtain a fourth result; and assigning, by the computer system, the second data object to one of the N' buckets that corresponds to the fourth result.

20. The method of claim 16, wherein the first and third hashing functions are a same function that includes:
- dividing the M buckets into a number of groups, wherein the number of groups is equal to $\log_2(M)$, wherein each group has an associated group number, and wherein a number of the M buckets mapped to a given group is based on the associated group number for that group;
- selecting a particular group number for the key using a subset of bits of the key; and
- using a pseudo-random value, determining a bucket for the key, wherein the pseudo-random value is based on the key and an initial bucket for the particular group number.

* * * * *